(12) United States Patent
Nguyen

(10) Patent No.: US 7,237,803 B2
(45) Date of Patent: Jul. 3, 2007

(54) REAR DRAG WHEEL MOUNT

(76) Inventor: Tony Van Nguyen, 8790 Donaker St., San Diego, CA (US) 92129

( * ) Notice: Subject to any disclaimer, the term of this patent is extended or adjusted under 35 U.S.C. 154(b) by 298 days.

(21) Appl. No.: 10/823,018

(22) Filed: Apr. 12, 2004

(65) Prior Publication Data
US 2005/0225067 A1 Oct. 13, 2005

(51) Int. Cl.
B60R 27/00 (2006.01)
(52) U.S. Cl. .................. 280/767; 280/762; 280/770; 280/727
(58) Field of Classification Search ............ 280/763.1, 280/764.1, 765.1, 767–770, 762, 47.33, 47.16; 296/41
See application file for complete search history.

(56) References Cited

U.S. PATENT DOCUMENTS

| | | | | |
|---|---|---|---|---|
| 496,285 | A | * | 4/1893 | Stely ........................ 280/47.15 |
| 993,805 | A | * | 5/1911 | Tallman ..................... 280/47.33 |
| 1,163,354 | A | * | 12/1915 | Meiners ..................... 280/47.15 |
| 2,834,608 | A | * | 5/1958 | Wixson ....................... 280/767 |
| 3,043,618 | A | * | 7/1962 | Petirrojo ..................... 293/145 |
| 3,135,528 | A | | 6/1964 | Martin |
| 3,217,478 | A | * | 11/1965 | De Geere ..................... 56/228 |
| 3,271,050 | A | * | 9/1966 | Saunders ..................... 280/507 |
| 3,734,532 | A | * | 5/1973 | Mattson ....................... 280/767 |
| 3,883,159 | A | * | 5/1975 | Whitley, Jr. .............. 280/414.1 |
| 3,950,899 | A | * | 4/1976 | Gilbert ........................ 451/370 |
| 4,303,254 | A | | 12/1981 | Swanson et al. |
| 4,986,571 | A | | 1/1991 | Godbersen |
| 5,184,840 | A | * | 2/1993 | Edwards ..................... 280/507 |
| 5,316,329 | A | | 5/1994 | MacKarvich |
| 5,509,681 | A | * | 4/1996 | Keller ...................... 280/415.1 |
| 5,695,204 | A | * | 12/1997 | Ford .......................... 280/507 |
| 5,813,687 | A | | 9/1998 | Lay et al. |
| 6,612,602 | B1 | | 9/2003 | MacKarvich |
| 6,616,373 | B1 | | 9/2003 | Kennedy |
| 6,880,852 | B2 | * | 4/2005 | Lim ........................... 280/653 |
| 2001/0033071 | A1 | | 10/2001 | Krumwiede |

OTHER PUBLICATIONS

Paktron Industries website, www.pakindustries.com, dates: Apr. 6, 2001 and Apr. 12, 2001; model Nos. 10-2201, 10-4202, and 10-4203.*

* cited by examiner

Primary Examiner—Christopher P. Ellis
Assistant Examiner—Vaughn T. Coolman
(74) Attorney, Agent, or Firm—Donn K. Harms

(57) ABSTRACT

A drag wheel and mount attachable to the angular skid bracket engaged on the rear of a motor vehicle such as a trailer or motorhome without removing or otherwise altering the angular skid bracket. The device features a roller rotationally engaged on the distal end of a mount. The mount is adapted to attach to the angular skid bracket in a compressible engagement without altering or drilling the skid bracket or detaching it from the vehicle. The roller projects past the lower surface of the angular skid bracket on two sidewalls and contacts the road surface in the event the vehicle tilts sufficiently to cause the skid bracket to strike the road.

17 Claims, 1 Drawing Sheet

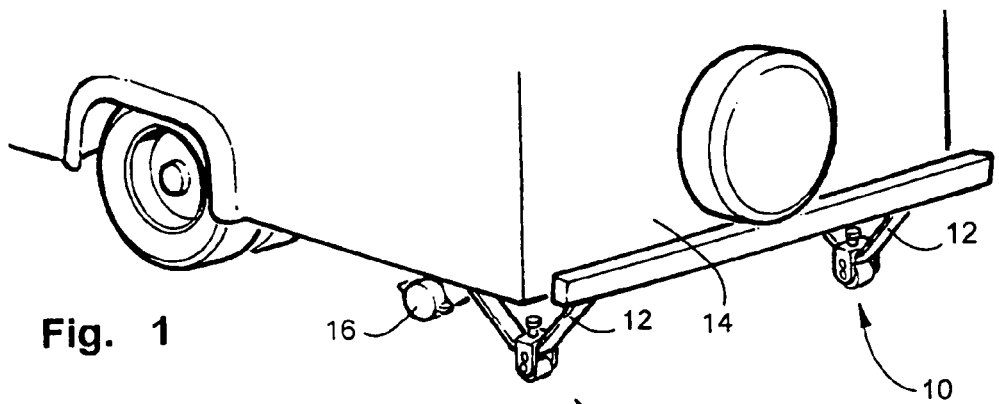
Fig. 1
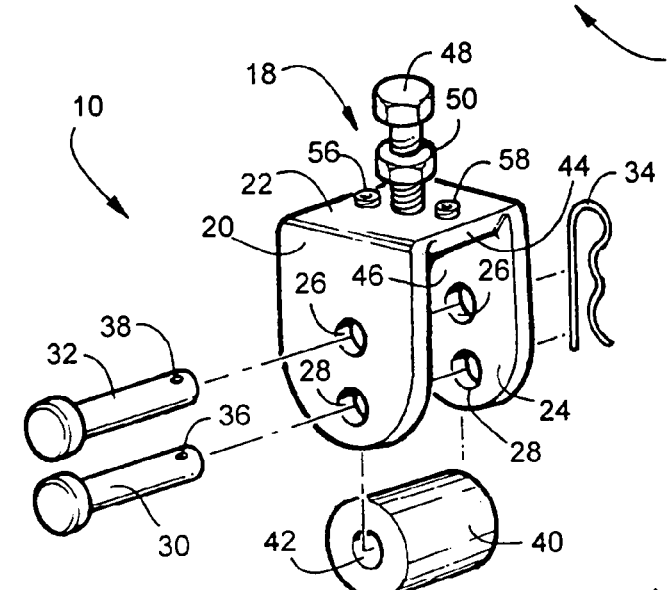
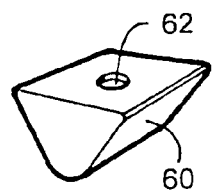
Fig. 5
Fig. 2
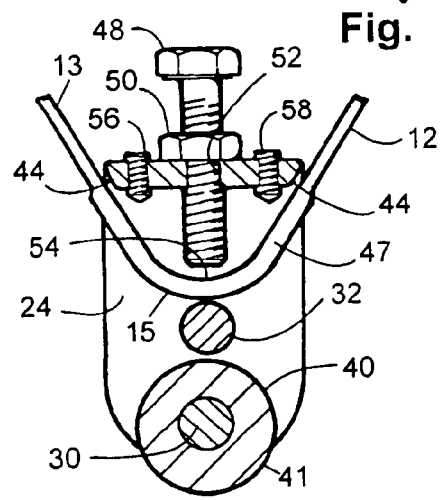
Fig. 3
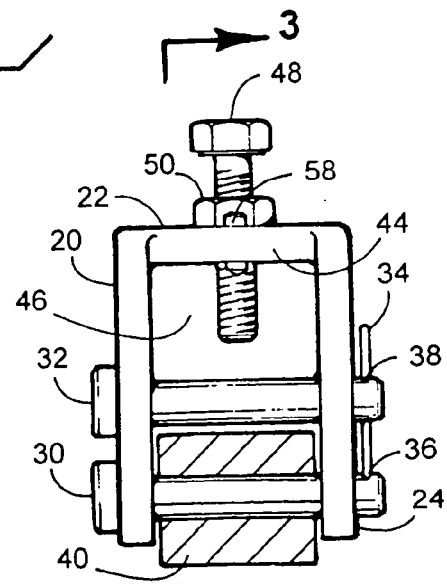
Fig. 4

REAR DRAG WHEEL MOUNT

FIELD OF THE INVENTION

The present invention relates to an improvement in the field of protecting the rear under carriage of motor homes and trailers and similar vehicles having a long tail section which tends to drag on the road under certain driving conditions. More particularly, but not by way of limitation, the disclosed device relates to a unique rear drag wheel and mount adapted for attachment to the angular skid brackets with which the factory equips most of these vehicles. More specifically, the device features a mount and drag wheel which can be attached or removed easily from the skid bracket on motor homes and trailers, without any drilling of the bracket, using simple hand tools.

BACKGROUND OF THE INVENTION

When motor homes and trailers traverse over uneven terrain such as driveways or dips in the road or similar abrupt roadway transitions, the rear of the vehicle often comes within close proximity to the drive or road surface. Such transitions often cause the rear of such vehicles to drag upon the road surface causing expensive damage. Further, frequently the plumbing for the sewer and water pipes extend below the rear frame member causing them to be crushed between the vehicle and roadway if the transition on a driveway is too abrupt.

As a prevention measure, vehicle manufacturers most often put angular skid brackets at the rear of such extended vehicles to protect the rear under carriage from abrasion. These angular skid brackets conventionally consist of a one inch wide by one-eighth of an inch thick steel strap bent into a generally triangular shape or angle and welded to the rear frame. The radius of the bend which is at the lowest point when attached to the vehicle is reinforced to a one-quarter inch thickness to withstand the abrasion when the unit is dragged over a concrete or asphalt surface.

Such brackets have their defects in that any severe dragging of the angular skid brackets on a roadway surface frequently breaks the weld to the vehicle frame breaking the bracket loose. Because of the isolated location on the vehicle, drivers are unaware of their loss until severe damage to the vehicle occurs on a subsequent dragging of the rear end.

Some vehicle owners have attempted to correct the problem of dragging the rear of their vehicle by adapting conventional steel casters at the rear. This solution does not work well because most steel casters do not mount easily on the frame of the vehicle. Further, such casters are not big enough to extend below the undercarriage a distance to fully protect the sewer and water pipes that extend below the frame.

The disclosed device herein describes a new, unique and inexpensive rear drag wheel and mount which can easily be attached to the lowest point of such angular skid brackets at the rear of motor homes and trailers. The device is attachable without drilling which would weaken the bracket structurally and is attachable with simple hand tools. The disclosed rear drag wheel and mount, once attached, allow the angular skid brackets to simply roll over most concrete or asphalt surfaces easily, eliminating damage to and dismounting of the bracket, and saving damage to the rear under carriage of the vehicle.

REFERENCES CITED

U.S. Pat. No. 6,612,602 B1 of Charles J. MacKarvich presents a boat trailer having roller mounts that are adjustable when the boat support rollers are engaged by the hull of a boat being mounted on the trailer to reposition the boat support rollers of the trailer so that they conform to the progressively changing shape of the boat hull as the boat is rolled onto the trailer. This patent describes a boat trailer roller mounts that makes contact with the boat for rolling onto the trailer, but this device does not offer any protection to the rear of the boat trailer when it goes over the abrupt transition in a driveway.

U.S. Pat. No. 6,616,373 B1 of James L. Kennedy teaches of a boat-launching device. The boat-launching device is portable and attaches to the front of a vehicle so that the driver has a front view while launching the boat into the water. The boat launching device includes a first link member that is connected to a second link member. The link members are attached to the front of a vehicle and to a boat trailer. The link members are detachable from each other after use and may be stored on the boat trailer. Kennedy teaches about a boat launching device for attaching an additional tow mechanism to the front of the tow vehicle. It does not offer any protection to the rear of the boat trailers and in most cases boat trailers do not have the angular skid brackets at the rear.

U.S. Patent No. U.S. 2001/0033071 A1 of Derek W. Krumwiede describes an adjustable snowmobile caddy consisting of a telescoping frame set atop four wheels. The frame comprises a plurality of square steel tubing cross bars which are parallel to each other and two square steel tubing opposing support members which are parallel to one another, wherein the cross bars are attached to the two horizontal support members like rungs on a ladder. The adjustable snowmobile caddy is designed to permit a single individual to drive and store a snowmobile on the caddy without assistance. The snowmobile caddy can also be easily and conveniently moved around a garage or other area with a flat surface.

Krumwiede describes an adjustable snowmobile caddy that has not been designed to transport the snowmobile on the highway, or have any similarities to conventional trailers.

U.S. Pat. No. 5,813,687 of Alvin Loise Lay et al. relates to an auxiliary wheel assembly for temporarily supporting one side of a trailer frame wherein the assembly includes a wheel carried by a strut, which is vertically adjustable relative to a support tube. The assembly also includes clamping elements for securing the tube to and directly beneath the frame without interfering with the structural integrity of the frame. The Lay patent relates to a spare wheel assembly for trailers that is designed to be attached at the front of the trailer for temporarily supporting the trailer when it has been removed from the tow vehicle. In the position at the front of the trailer the device will offer no protection to the rear of the trailer.

U.S. Pat. No. 5,316,329 of Charles J. MacKarvich discloses a sliding boat trailer roller mount used when loading or unloading a boat from a boat trailer. The roller mount includes a mounting arm with an arch, a saddle with a curved groove in which the mounting arm rocks and slides, a roller at each end of the mounting arm, a pair of saddles that are attached to the ends of a pivot arm, and a plurality of pairs of pivot arms are pivotally mounted on a boat trailer. The curvature of the mounting arm is such that it slides and pivots within the curved groove of the saddle, allowing the rollers to follow the compound curvature of a boat hull during loading or unloading. The MacKarvich patent discloses another boat trailer roller mount that makes contact with the boat for rolling onto the trailer, but this device does not offer any protection to the rear of the boat trailer when it goes over the abrupt transition in a driveway.

U.S. Pat. No. 4,986,571 of Byron L. Godbersen additionally describes a boat trailer having a frame, wheel unit, an adjustably mounted winch unit including a keel engaging member, an elongated second keel engaging member pivotally mounted on the frame rearwardly of the winch unit and self-centering to engage a longitudinal length of the keel, a pair of fender units each of which is reversibly mountable on either side of the frame for protecting a wheel, a pair of unitary post load guide brackets slidably engaged with the rear of the frame members and each supporting both a post guide and a rear taillight, a cross member pivotally and longitudinally adjustably mounted at each end to a frame member, and a pair of bunks and a pair of aligned, resiliently mounted roller units interchangeably mounted on said cross member for providing an automatic, full line engagement of either the bunks or the roller units with the bottom of the hull, when loaded, in combination with the second keel engaging member, forming a self-adjusting three point support of the boat hull. This patent describes a fender unit for use with a boat trailer or the like but does not incorporate any protection for the rear of the trailer.

U.S. Pat. No. 4,303,254 of Rodney C. Swanson tells of a retractable caster wheel for a trailer in which the caster wheel is mounted on the tongue of a trailer for swiveling movement about an upright caster axis and also for swinging movement between a lowered support position and a raised storage position, and in which the caster axis remains upright during swinging of the caster wheel between the lowered and raised positions. The caster wheel can be positioned and used at positions intermediate to its lowered and raised positions to support the trailer tongue at different heights and the mechanism is advantageously provided for positively adjusting the caster wheel between its lowered and raised positions.

This patent tells of another patent that relates to a to a retractable spare wheel assembly for trailers that is intended to be attached at the front of the trailer for temporarily supporting the trailer when it has been removed from the tow vehicle. The device is not adapted to attach to the factory installed bracket at the vehicle rear and will offer no protection to the rear of the trailer.

None of these previous efforts, however, provides the benefits attendant with the present invention. The present invention achieves its intended purposes, objects and advantages over the prior art devices through a new, useful and un-obvious combination of component elements with the use of a minimum number of functioning parts at a reasonable cost to manufacture, and by employing readily available materials.

Thus, there is a continuing need for improved, inexpensive, after market automotive adapted for easy attachment to the conventional extended rear bracket on trailers and motor homes, to protect the under carriage and vehicle components at the rear of the vehicle. Such a device should be mountable without drilling and be attachable by the average individual in minutes with simple hand tools. In this respect, before explaining at least one preferred embodiment of the invention in detail, it is to be understood that the invention is not limited in its application to the details of construction and to the arrangement of the components set forth in the following description or illustrated in the drawings. The invention is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent construction insofar as they do not depart from the spirit and scope of the present invention.

SUMMARY OF THE INVENTION

The device herein described and disclosed is defined by the appended claims with the specific embodiments shown in the attached drawings. Briefly stated, the present invention contemplates a novel rear drag wheel mount to be attached to the angular skid brackets at the rear of motor homes and trailers. Angular skid brackets are commonly used at the rear of motor homes and trailers to prevent the back end from dragging the pavement when the vehicle goes over a driveway that has an abrupt transition. A common occurrence that happens when vehicles without angular skid brackets or where the angular skid brackets have broken off is the sewer drain that is normally at the back of the vehicle gets crushed between the vehicle and the pavement.

The rear drag wheel mount consists of a clevis having a left side, a top and a right side. The left side and the right side have parallel orifices for the insertion of the axle pin and the support pin. The axle pin and the support pin are held firmly in position by the means of the spring clip inserted through small parallel orifices in the ends of the pins. A hardened steel roller wheel, preferably of steel or some other hard material, is positioned between the left side and the right side of the clevis with the axle pin translating within the parallel orifices and the orifice in the roller wheel.

The top of the clevis has a bevel on both sides to accommodate the corresponding angles on the angle skid brackets and to enable the device to be mounted at the bend or angle of the bracket which is generally the lowest point below the vehicle. The clevis internal cavity is adequately large enough to hold the enlarged section of the angular skid brackets. A central bolt with a lock nut will thread through a threaded orifice in the top surface and onto a spacer or direction onto the skid bracket putting pressure on the center of the radius of the angular skid brackets against the support pin to hold the clevis in position. Two setscrews add additional support to tighten the clevis into position.

An alternate preferred embodiment of the rear drag wheel mount will have all the same elements of the preferred embodiment with the addition of an angular wedge block to be inserted between the radius of the angular skid bracket and the end of the central bolt with the setscrews adding additional pressure. A spherical indentation locates and retains the wedge block in position within the clevis internal cavity.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

THE OBJECTS OF THE INVENTION

It is a general object of this invention to protect the rear under carriage of motor homes and trailers.

Another object of this invention is to create a rear drag wheel mount adapted to attach to the existing angular skid brackets on extended motor homes and trailers.

A further object of this invention is to create a rear drag wheel mount for motor homes and trailers that will easily roll over concrete and asphalt curbs.

An additional object of this invention is to create a rear drag wheel mount for motor homes and trailers that can easily be installed or removed with conventional hand tools without drilling.

A still further object of this invention is to create a rear drag wheel mount for motor homes and trailers that is inexpensive to manufacture and light weight and compact for shipping and handling.

Yet another object of this invention is to create a rear drag wheel mount for motor homes and trailers that will support the weight if the vehicle goes over a driveway with an abrupt transition in it.

A further object of this invention is to add another after market device to the field of motor home and trailer parts.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The accompanying drawings, which are incorporated in and form a part of this specification, illustrate embodiments of the invention and together with the description, serve to explain the principles of this invention.

FIG. 1 depicts a perspective view of the rear of a motor home or trailer illustrating one conventional location of widely used angular skid brackets showing the rear drag wheel mounts attached.

FIG. 2 depicts an exploded perspective view of a preferred embodiment of a single rear drag wheel mount.

FIG. 3 depicts a cross section through the side of a preferred embodiment of the rear drag wheel mount.

FIG. 4 depicts an end view of the preferred embodiment of the rear drag wheel mount.

FIG. 5 depicts a perspective view of an angular wedge block to be inserted into an alternate embodiment of the rear drag wheel mount for added support at the bend.

DETAILED DESCRIPTION OF THE PREFERRED EMBODIMENTS

For a fuller understanding of the nature and objects of the invention, reference should be had to the following detailed description taken in conjunction with the accompanying drawings which are incorporated in and form a part of this specification illustrate embodiments of the invention and together with the description, serve to explain the principles of this invention.

FIG. 1 depicts two rear drag wheel mounts 10 attached to the bend or lowest point of two angular skid brackets 12 at the rear of a motor home or trailer 14. Such angular skid brackets 12 are commonly used at the rear of motor homes and trailers 14 to prevent the back end of the vehicle from dragging the pavement when the vehicle goes over a driveway or other roadway encounter which has an abrupt transition. When vehicles without such angular skid brackets 12 or where the angular skid brackets 12 have broken off, it is a common occurrence that the sewer drain 16 that is normally at the back of the vehicle gets crushed between the vehicle and the pavement. Consequently it is highly desirable to maintain the angular skid brackets 12 firmly mounted to the vehicle and in good repair.

FIG. 2 depicts an exploded perspective view of the preferred embodiment of a single rear drag wheel mount 10 illustrating the clevis 18 having a left side 20, a top 22 and a right side 24. The left side 20 and the right side 24 have parallel in-line orifices 26 and 28 for the insertion of the axle pin 30 and the support pin 32. The axle pin 30 and the support pin 32 are held firmly in position by means for a fixed removable mount depicted as spring clip 34 inserted through parallel orifices 36 and 38 which are aligned when the axle pin 30 and support pin 32 are in a mounted position engaged in orifices 26 and 28.

A roller wheel 40 preferably of hardened steel or a similar material not easily crushed or dented, is positioned between the left side 20 and the right side 24 of the clevis 18 with the axle pin 30 translating within orifice parallel orifices 28 and the orifice 42 communicating through the roller wheel 40. Of course other manner of mounting the roller wheel 40 to a compressibly engageable mount might be used so long as the circumferential surface 41 of the roller wheel 40 projects below the bottom surface 13 of the angular skid bracket 12, without altering the attached skid bracket 12, and all such changes are anticipated within the scope of this patent.

Preferably, and in order to accommodate the slope of conventional triangular shaped skid brackets 12, the top 22 of the clevis 18 has a bevel 44 on both side edges to accommodate the angle on the angle skid brackets 12 while the clevis internal cavity 46 defined by the space between the left side 20 and right side 24 is dimensioned sufficiently large enough to accommodate the enlarged section 47 of the angular skid brackets 12. To keep the device tightly engaged to the angular skid bracket 12, a central bolt 48 with a lock nut 50 or other means for fixed engagement will thread through orifice 52 putting pressure on the center of the radius 54 of the bend on the angular skid brackets 12 thereby maintaining the clevis 18 in a fixed position. Optional setscrews 56 and 58 add additional support to tighten the clevis 18 into position.

As can be seen the device can be easily compressibly mounted to such angular skid brackets 12 by simply slipping the clevis 18 over the angular skid bracket 12 where it is accommodated in the internal cavity 46. Once so engaged, the support pin 32 is engaged between the left side 20 and the right side 24 on the bottom side 15 of the angular support bracket 12 whereafter the central bolt 48 may be tightened to compress the support bracket 12 between the central bolt 48 and the support pin 32 thereby providing a means to compressibly engage the clevis 18 to the support bracket 12 without the need to drill or otherwise alter or weaken the support bracket 12.

The roller wheel 40 may then be positioned between the left side 20 and the right side 24 of the clevis 18 and mounted using the axle pin 30 engaged therethrough and with the left side 20 and right side 24 providing means for rotational engagement of the roller wheel 40 with the clevis 18 and below the bottom side 15 of the angular support bracket 12.

An alternate preferred embodiment of the rear drag wheel mount 10 to the angular support bracket 12 will have all the same elements of the first preferred embodiment with the addition of an angular wedge block 60 shown in FIG. 5. The angular wedge block 60 would be inserted in the compressible engagement of the clevis 18 to the angular support bracket 12 by placing it between the radius 54 of the angular skid bracket 12 at the top surface 13 of the angular support bracket 12 and the distal end of the central bolt 48. When the central bolt 48 is rotated to impart compression force against the support pin 32 with the angular bracket 12 in-between, the exterior surface of angular wedge block 60 which is best dimensioned in the same shape as the angular support bracket 12, will engage upon top surface 13 of the angular bracket 12 reinforcing the angular bracket 12 along the entire area of contact and providing more surface area of contact for the compression engagement of the clevis 18 to the angular support bracket 12. Additional compression force may be provided by optional setscrews 56 and 58. Use of the angular wedge block 60 having an exterior surface adapted to engage the top surface 13 of the angular bracket 12 provides additional strength to the angular bracket 12 as well as the above noted additional contact surface area for a better compressible engagement. A spherical indentation 62 may be included to provide a means to locate the wedge block 60 to the distal end of the central bolt 48 which engages the block 60 during tightening to its compressed fitment in position within the clevis 18 internal cavity 46 against top surface 13 of the angular bracket 12.

The rear drag wheel mount 10 shown in the drawings and described in detail herein discloses arrangements of elements of particular construction and configuration for illustrating preferred embodiments of structure and method of operation of the present invention. It is to be understood, however, that elements of different construction and configuration and other arrangements thereof, other than those illustrated and described may be employed for providing a rear drag wheel mounts 10 in accordance with the spirit of this invention, such as using a single sidewall supporting a roller at a distal end, or other changes which still yield a compressibly engaged mount supporting a roller rotationally engaged to have its circumferential surface contact the roadway instead of the bottom of skid bracket, and such changes, alternations and modifications as would occur to those skilled in the art are considered to be within the scope of this invention as broadly defined in the appended claims.

Further, the purpose of the abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A drag wheel apparatus adapted for cooperative engagement with an angular skid bracket engaged upon the rear of a vehicle used for travel over a road surface, comprising:

at least one roller having a circumferential surface;

a mount, said mount having a first sidewall, said first sidewall having an attachment end, a mid portion, and a distal end opposite said attachment end;

said mount having a second sidewall, said second sidewall having an attachment end, a mid portion, and a distal end opposite said attachment end;

a topwall engaged to said first sidewall and second side wall at their respective attachment ends;

said mount having a mounted position wherein lower portions of said distal ends of said first sidewall and said second sidewall extend below a bottom surface of said angular skid bracket;

an axle, said axle cooperatively engageable through said roller between said lower portions of said first and second sidewall with said circumferential surface projecting beyond said distal ends of said sidewalls;

a support pin in a removable engagement with said first and second sidewall of said mount in said mounted position, said removable engagement positioning said support pin between said axle and said bottom surface of said angular skid plate; and means to force said topwall away from said angular skid bracket thereby subjecting a compressive force of said support pin against said bottom surface of said angular skid bracket, to maintain said mount in said mounted position.

2. The drag wheel apparatus of claim 1 wherein said means to force said topwall away from said angular skid bracket comprises:

an elongated member translatably engaged through said topwall, said elongated member having an adjustment end and a distal end opposite said adjustment end; and said distal end of said elongated member translatable toward said distal ends of said sidewalls, to an extended position communicating a compressive force against a top surface of said angular skid bracket opposite said bottom surface.

3. The drag wheel apparatus of claim 2 additionally comprising:

means to lock said distal end of said elongated member in said extended position.

4. The drag wheel apparatus of claim 2 wherein said elongated member translatably engaged through said topwall comprises:

said elongated member being a bolt, said bolt threadably engaged through said topwall; and rotation of said bolt in a first direction causing said distal end of said bolt to translate toward said extended position.

5. The drag wheel apparatus of claim 3 wherein elongated member translatably engaged through said topwall comprises:
said elongated member being a bolt, said bolt threadably engaged through said topwall; and
rotation of said bolt in a first direction causing said distal end of said bolt to translate toward said extended position.

6. The drag, wheel apparatus of claim 5 wherein said means to lock said distal end of said elongated member in said extended position comprises:
a nut rotationally engaged upon said bolt; and
said nut rotatable to cause a force reaction between threads of said bolt, said topwall and said nut, thereby discouraging relative rotational movement between said bolt and said topwall.

7. The drag wheel apparatus of claim 2 additionally comprising:
a wedge block having a top surface and a lower surface;
said lower surface dimensioned to substantially the shape of said top surface of said angular skid bracket;
said wedge block positionable between said distal end of said elongated member and said top surface of said angular skid bracket; and
said lower surface of said wedge block being engaged with said top surface of said angular skid bracket when said distal end of said elongated member is in said extended position.

8. The drag wheel apparatus of claim 3 additionally comprising:
a wedge block having a top surface and a lower surface;
said lower surface dimensioned to substantially the shape of said top surface of said angular skid bracket;
said wedge block positionable between said distal end of said elongated member and said top surface of said angular skid bracket; and
said lower surface of said wedge block being engaged with said top surface of said angular skid bracket when said distal end of said elongated member is in said extended position.

9. The drag wheel apparatus of claim 4 additionally comprising:
a wedge block having a top surface and a lower surface;
said lower surface dimensioned to substantially the shape of said top surface of said angular skid bracket;
said wedge block positionable between said distal end of said elongated member and said top surface of said angular skid bracket; and
said lower surface of said wedge block being engaged with said top surface of said angular skid bracket when said distal end of said elongated member is in said extended position.

10. The drag wheel apparatus of claim 5 additionally comprising:
a wedge block having a top surface and a lower surface;
said lower surface dimensioned to substantially the shape of said top surface of said angular skid bracket;
said wedge block positionable between said distal end of said elongated member and said top surface of said angular skid bracket; and
said lower surface of said wedge block being engaged with said top surface of said angular skid bracket when said distal end of said elongated member is in said extended position.

11. The drag wheel apparatus of claim 6 additionally comprising:
a wedge block having a top surface and a lower surface;
said lower surface dimensioned to substantially the shape of said top surface of said angular skid bracket;
said wedge block positionable between said distal end of said elongated member and said top surface of said angular skid bracket; and
said lower surface of said wedge block being engaged with said top surface of said angular skid bracket when said distal end of said elongated member is in said extended position.

12. The drag wheel apparatus of claim 1 additionally comprising:
said angular skid bracket having a top surface opposite said bottom surface;
a wedge block having a top surface and a lower surface;
said lower surface dimensioned to substantially the same shape of said top surface of said angular skid bracket; and
said wedge block positionable between said top wall and said top surface of said angular skid bracket when said mount is in said mounted position with substantially all of said lower surface of said wedge block in contact with said top surface of said angular skid bracket.

13. The drag wheel apparatus of claim 1 additionally comprising: said angular skid bracket being substantially triangular in shape.

14. The drag wheel apparatus of claim 12 additionally comprising: said angular skid bracket being substantially triangular in shape.

15. A drag wheel apparatus adapted for cooperative engagement with an angular skid bracket engaged upon the rear of a vehicle used for travel over a road surface, comprising:
at least one roller having a circumferential surface;
a mount, said mount having a first sidewall, said first sidewall having an attachment end, a mid portion, and a distal end opposite said attachment end;
said mount having a second sidewall, said second sidewall having an attachment end, a mid portion, and a distal end opposite said attachment end;
a topwall engaged to said first sidewall and second side wall at their respective attachment ends;
said distal ends of said first sidewall and said second sidewall extending below said angular skid bracket when said mount is in said mounted position;
an axle, said axle cooperatively engageable through said roller and with said first sidewall and said second sidewall thereby engaging said roller to a mounted position; and
said roller when in said mounted position having said circumferential surface projecting beyond said distal ends of said sidewalls;
said angular skid bracket having a bottom surface opposite said top surface;
a support pin removably engageable with said first and second sidewalls at said mid portion adjacent to said axle and between said bottom surface and said axle; and
means to force said topwall away from said angular skid bracket thereby subjecting a compressive force of said support pin against said bottom surface of said angular skid bracket, to maintain said mount in said mounted position.

16. The drag wheel apparatus of claim 15 wherein said means to force said topwall away from said angular skid bracket comprises:

an elongated member translatably engaged through said topwall, said elongated member having an adjustment end and a distal end opposite said adjustment end; and said distal end of said elongated member translatable toward, said top surface of said angular skid bracket, whereby translation of said elongated member subjects said angular skid bracket to a compressive force between said distal end of said elongated member and said support pin.

17. The drag wheel apparatus of claim 16 wherein elongated member translatably engaged through said topwall comprises:

said elongated member being a bolt, said bolt threadably engaged through said topwall;

rotation of said bolt in a first direction causing said distal end of said bolt to translate toward said angular support bracket to communicate said compressive force thereto; and continued rotation of said bolt in said first direction causing a proportional increase in said compressive force.

\* \* \* \* \*